Feb. 13, 1940.　　　W. M. BLEAKNEY　　　2,189,775
DYNAMICALLY COMPENSATED STRAIN GAUGE
Filed Dec. 12, 1936　　2 Sheets-Sheet 1
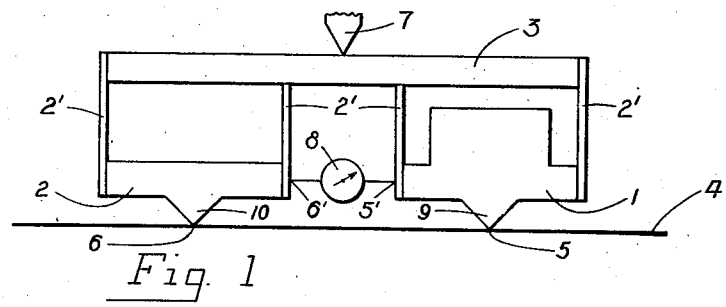
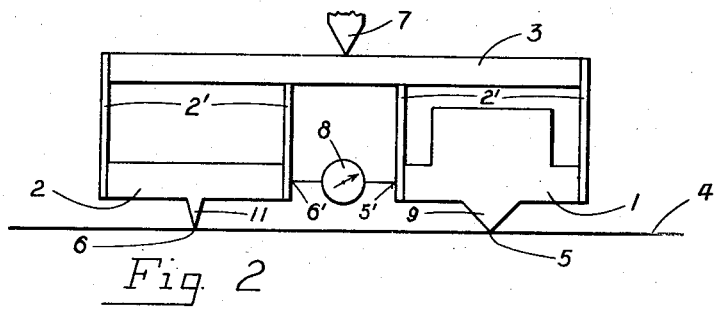
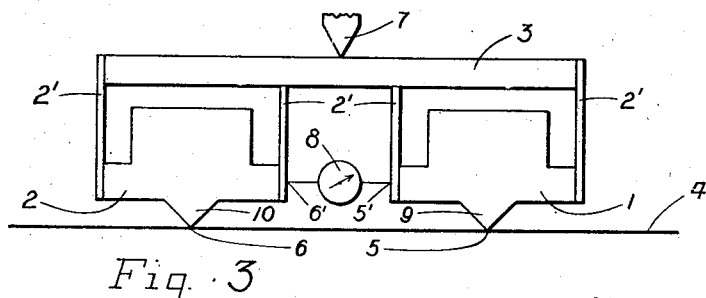
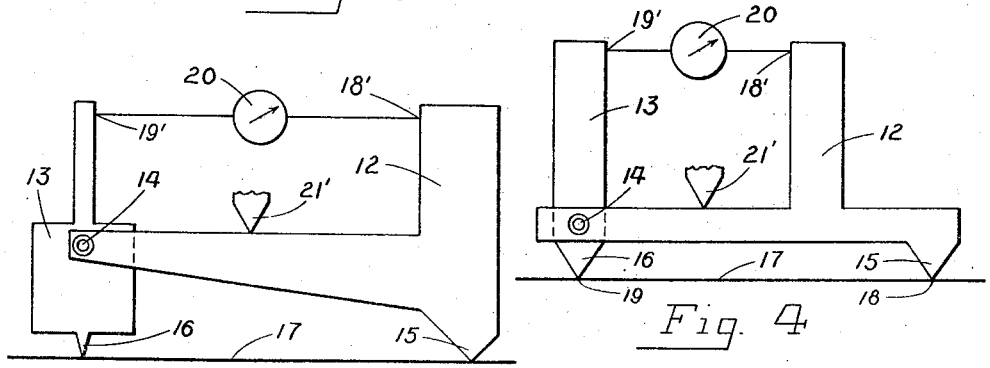
INVENTOR
WILLIAM M. BLEAKNEY
BY
ATTORNEY Feb. 13, 1940.  W. M. BLEAKNEY  2,189,775
DYNAMICALLY COMPENSATED STRAIN GAUGE
Filed Dec. 12, 1936  2 Sheets-Sheet 2

INVENTOR
WILLIAM M. BLEAKNEY
BY
ATTORNEY

Patented Feb. 13, 1940

2,189,775

UNITED STATES PATENT OFFICE 2,189,775

DYNAMICALLY COMPENSATED STRAIN GAUGE

William M. Bleakney, Washington, D. C.

Application December 12, 1936, Serial No. 115,582

9 Claims. (Cl. 33—147)

(Granted under the act of March 3, 1883, as amended April 30, 1928; 370 O. G. 757)

My invention relates to an improved device for detecting or measuring strains or other relative displacements in a vibrating body and to a method for compensating the same such that the inertia or reaction forces acting on the component parts of the device incidental to its use will not substantially affect its indications.

The fields of usefulness of instruments for measuring strain or other relative displacements can be conveniently divided into two parts; first, the field of static or quasi-static measurements, in which the external and gravity forces which act upon the various parts of the instrument are substantially statically balanced; and second, the field of dynamic measurements, in which there are unbalanced external forces which produce acceleration of considerable magnitude. For the sake of clarity and conciseness in exposition, the term "inertia forces" will be used to designate those external forces which produce acceleration in a body in combination with those imaginary body forces which oppose and balance the external forces. The system of inertia forces as just defined is at all times a balanced system. It is completely determined by the acceleration given to the body, the inertia of the body, and the location of the contact points; and it in turn completely determines the distortions which are associated with the acceleration.

In the first field mentioned above all the forces are completely determined by the method of mounting the instrument and by the relative displacement which is to be measured. The corresponding deformations can therefore be taken into account by calibration if their effects are appreciable. In the second group the deformations arising from the inertia forces are determined by the motion of the structure to which the instrument is attached. These deformations cannot in general be individually controlled and therefore present an entirely different problem, the solution of which is effected by the present invention.

Strains in bodies are usually measured by strain gauges which comprise at least two members or parts, two of which are suitably secured to points on the body between which the strain is to be determined. These two parts are theoretically restrained to relative motion of only one degree of freedom, which may be either translational or rotational, their relative displacement attending the measurement of any strain being observed by any suitable mechanical, electrical or optical indicating means. Such gauges are quite satisfactory for the measurement of steady strains but have proved wholly unsatisfactory when applied to the measurement of vibratory strains in vibrating structures. The accelerations of the gauges as a whole, which may be either translational or rotational or both, and the relative movement of the two gauge parts attending the measurement of a vibratory strain, produce inertia or reaction forces with consequent deformation or distortion of the component gauge parts so that instead of the theoretical one degree of freedom the gauge has many degrees of freedom and the reading of the indicating means is in general no longer in proportion to the relative motion of the two points in the gauge attached to the body which represents the true value of the vibratory strain in the body, but varies with the motions of the gauge as a whole or the relative movement of its two parts and may also vary with the frequency of the vibratory motion.

With a view to avoiding these defects inherent in the prior art strain gauges, when employing them for the measurement of vibratory strains in vibrating structures, it has been customary in the past to make the gauge parts as light and as rigid as possible to minimize the deformations thereof produced by the inertia or reaction forces. This expedient, however, has proved to be only partially successful and is entirely inadequate when seeking to measure or study vibratory strains attending the vibration of a body at high frequencies.

According to my invention I extend the range of usefulness and accuracy of the prior art strain gauges for the measurement of vibratory strains not by seeking to inhibit any deformation of the gauge parts as has been the custom heretofore, but by proportioning the stiffness of the various gauge parts to their masses such that the inertia or reaction forces attending the use of the gauge produce substantially no effect upon its indicating means notwithstanding the fact that the component gauge parts are elastically deformed by these forces. The mode of compensation which I here disclose may be effectively applied to any type of prior art strain gauge and may be used to compensate the gauge for translational or rotational accelerations of the gauge as a whole, or for deformations of the gauge parts occasioned by relative movement of two parts thereof attending the measurement of a vibratory strain, or for any combination of the aforesaid operating conditions.

With the foregoing preliminary discussion in view, it is an object of my invention to provide a device for detecting or measuring strains or other relative displacements in a vibratory body with a high degree of accuracy.

It is another object of my invention to provide a device for detecting or measuring strains or other relative displacements in a vibratory body wherein the mass and stiffness of the component parts are chosen such that the inertia forces acting will produce substantially no effect upon its indication although the parts are elastically deformed when the device is used for its intended purpose.

It is another and further object of my invention to provide a device for detecting or measuring strains or other relative displacements in a vibratory body which is compensated for longitudinal or transverse or rotational accelerations of the device as a whole, or for deformations of the parts of the device occasioned by relative movement of two parts thereof attending the detection or measurement of a vibratory strain or other relative displacement, or for any combination of the aforesaid operating conditions by choosing the mass, stiffness and arrangement of the component parts of the device such that all inertia forces acting will produce susbtantially no effect upon the indication of the device although the parts are elastically deformed when the device is used for its intended purpose.

It is another and still further object of my invention to provide a method for compensating a device adapted to the detection or measurement of strains or other relative displacements in a vibratory body which insures that the inertia forces acting will produce substantially no effect upon the indication of the device although the parts thereof are elastically deformed when the device is used for its intended purpose.

Other objects and many of the attendant advantages of this invention will be readily appreciated as the same becomes better understood by reference to the following detailed description when considered in connection with the accompanying drawings wherein:

Fig. 1 is a diagrammatic representation of one type of strain gauge;

Figs. 2 and 3 show different modes of compensating the gauge of Fig. 1 in accordance with my invention so as to make the same suitable for the accurate measurement of vibratory strain;

Fig. 4 shows schematically another type of strain gauge;

Fig. 5 shows the gauge of Fig. 4 compensated in accordance with my invention;

Figure 6:
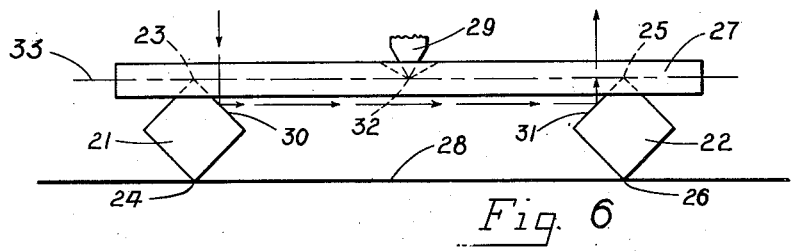
Fig. 6 depicts a still further type of strain gauge and the manner of compensating the same so as to insure the accurate measurement of vibratory strain.

As pointed out hereinbefore, my invention resides in proportioning the stiffness of the various parts of strain gauges adapted for the measurement of vibratory strain to their masses such that the inertia or reaction forces attending the use of the gauges produce substantially no effect upon their indication notwithstanding the fact that component gauge parts are elastically deformed by these forces. Before proceeding with a detailed description of the invention, however, it is deemed advisable at this point in the interest of clarity to define the word "stiffness" as it is used in the specification and claims and to discuss briefly those factors which are determinative of stiffness. By the word stiffness is meant the resistance which a member offers to elastic distortion or deformation when stressed by an applied force. As for the factors which are determinative of stiffness the following may be said. The stiffness of a member is a function of its size, shape and the modulus of elasticity of the material from which it is fabricated. It is at once evident that the stiffness of a member may be fixed by controlling only one of the three factors of size, shape and modulus of elasticity, or any two, or all three factors and in carrying my invention into effect it is to be understood that the stiffness of the component gauge parts may be fixed in any of these various manners.

Turning now to Figs. 1, 2 and 3 of the drawings, there is shown depicted in each figure a strain gauge including the parts or members 1 and 2 which are connected by means of flexure plates 2' to a bar 3. The members 1 and 2 as shown are provided with knife edges which engage the surface 4 of the body whose strain is to be measured at the points 5 and 6 respectively. The gauge is clamped to the surface 4 of the body by means of any suitable clamping device 7 of which a fragmentary portion only has been shown in order to simplify the disclosure. The parts 1 and 2 are under steady conditions restrained to one degree of relative movement with respect to each other which in this case is translational, any relative displacement attending the measurement of a strain in the body between the points 5 and 6 thereof producing an equal relative displacement of the points 5' and 6' which is indicated by any suitable measuring device 8 which, although shown as a mechanical device, may be either electrical or optical in nature.

Considering the gauge shown in Fig. 1 it will be observed that the part 1 thereof is of a greater mass than that designated by the numeral 2 and that knife edges 9 and 10 are equal in size, shape and, as they are made of the same material, have the same modulus of elasticity. It is therefore evident that if this gauge is given a longitudinal acceleration in the direction of the plane of the surface 4 with which it is in contact that the knife edges 9 and 10 and to a lesser degree other portions of the members 1 and 2 will be unequally distorted or deformed because of the presence of unequal inertia or reaction forces; and that the relative displacement of the points 5' and 6' will no longer be equal to the relative displacement of the points 5 and 6 so that the gauge will in general indicate a strain although no movement between the points 5 and 6 may have occurred. Thus although the body under test is actually under no strain the gauge does nevertheless give a spurious strain indication. If now the stiffness of each gauge part 1 and 2 is proportioned to its mass such that the inertia or reaction forces acting will produce substantially no effect upon the indicating device 8 when the body under test is actually not strained, the gauge will be compensated and give accurate readings free from any effects produced by the inertia forces.

As one mode of compensating the gauge of Fig. 1, I may modify the stiffness of the knife edge 10 in Fig. 1 and give it a shape as shown at 11 in Fig. 2. The shape of the knife edge 11 is so chosen that when the gauge is used for its intended purpose the deformations of the knife edges 9 and 11 will be substantially equal with the result that the relative motion of points 5' and 6' will be substantially equal to the relative motion of points 5 and 6 and the indication of the measuring device 8 will in nowise be affected by longitudinal accelerations imparted to the gauge as a whole. It may be necessary to obtain a final adjustment of the gauge by removing material at suitable points until no indication of strain is recorded when no movement of the point 5 relative to the point 6 occurs upon setting the test body in vibratory motion. The gauge is then compensated for this type of acceleration and of the possible movements of the points 5 and 6 of the body parallel to its surface only the relative point displacement will be indicated by the instrument.

Instead of compensating the gauge of Fig. 1 in the manner disclosed in Fig. 2 by adjusting the stiffness of the knife edge 10 it may be desirable instead to maintain the knife edges 9 and 10 unchanged, as shown in Fig. 3, and effect a compensation of the gauge by altering the mass distribution. Thus in Fig. 3 the masses of the gauge parts 1 and 2 have been made equal and the knife edges maintained unaltered. Under these conditions it is evident that the inertia forces to which the knife edges 9 and 10 in the device of Fig. 3 are subjected will be equal; and that any distortion of one knife edge or member will be compensated by an equal and like distortion of the other. Therefore after a final adjustment of the gauge in Fig. 3 as previously set forth, if this be necessary, this gauge then will also be compensated for this type of acceleration and will indicate accurately any relative displacement between the points 5 and 6 of the body under test free from the inertia forces acting upon the gauge parts 1 and 2.

In Fig. 4 of the drawings, there is shown another type of strain gauge which includes the members 12 and 13 pivoted to each other at the point 14 and provided respectively with knife edges 15 and 16 for engaging the surface 17 of a body whose strain is to be measured between the points 18 and 19. Any suitable indicating device 20 is attached to the points 18' and 19' of the parts 12 and 13 of the strain gauge for measuring any relative rotational movement therebetween occasioned by a strain in the body under test between the points 18 and 19. A suitable clamping device 21', a portion only of which has been shown, serves to hold the gauge in engagement with the body under test. Since the knife edges 15 and 16 of this gauge are of equal stiffness it is at once evident that the gauge will give spurious strain indications when it is used to measure vibratory strains in the body under test since the masses of the parts 12 and 13 are unequal which results in unequal inertia or reaction forces acting upon the knife edges and members 12 and 13 to deform or distort the same.

The gauge in Fig. 4, as compensated for longitudinal accelerations of the gauge as a whole, is shown in Fig. 5. In this latter figure the center of mass of the rotating part 13 has been shifted below the pivot point 14 so that the inertia forces acting will produce reactions on the knife edges 15 and 16 which are in the same direction. The masses of the parts 12 and 13 are now chosen in relation to the stiffness of the knife edges 15 and 16 such that the inertia forces acting will produce substantially no effect upon the relative position of the points 18' and 19' and therefore on the indicating device 20 though the parts are distorted when the gauge is used for its intended purpose. This compensation may be effected by altering either the masses of the parts 12 and 13, or the stiffness of the knife edges 15 and 16, or to a lesser degree of the parts of the members 12 and 13, or both the mass and stiffness, all as pointed out hereinbefore in connection with the gauges of Figs. 1 to 3.

In testing the accuracy of adjustment of any compensated gauge for longitudinal accelerations of the gauge as a whole the gauge may, for example, be clamped to a comparatively rigid piece of steel and vibratory motion applied to the steel without appreciably deforming it. If the strain in the steel is negligible the indication of the instrument will represent the accuracy of adjustment or compensation. In practice, sufficiently accurate tests may also be made in some cases by applying a steady force to each part of the gauge in proportion to the mass of that part and in line with its center of gravity.

Returning now to the gauge of Fig. 1, methods for compensating this gauge for rotational or angular accelerations of the gauge as a whole will now be disclosed. Consider an angular acceleration about any axis normal to the plane of the drawing. The inertia forces acting on each of the members 1 and 2 are then equivalent to those produced by a translational acceleration combined with an angular acceleration of the member about an axis normal to the plane of the drawing and passing through its center of mass. Compensation for the longitudinal component of this translational acceleration may be obtained as explained above, since this component is the same for both of the members 1 and 2. The effect of the transverse component on the indication of the instrument, however, is eliminated by placing the centers of mass of the members 1 and 2 directly above the points 5 and 6, respectively, as indicated in Figures 1, 2 and 3.

The angular acceleration of the member 1, for example, about its center of mass will result in a couple being applied through the two flexure plates 2' which are attached to it, and this couple will extend one flexure plate and contract the other. As a consequence the member 1 will rotate as a result of the deformation in the flexure plates through an angle which is determined for a given acceleration by the moment of inertia of the member 1, the stiffness or resistance to deformation of the flexure plates, and their separation. Likewise the member 2 will be caused to rotate in response to deformation in the flexure plates attached to it, and these rotations of members 1 and 2 will in general result in a relative displacement of the points 5' and 6', thus affecting the reading of the gauge.

It is now clear that this deleterious effect occasioned by angular accelerations of the gauge as a whole may be compensated in the gauge of Figs. 1, 2 or 3 or any gauge known to the prior art by making the rotations of the two members 1 and 2 in response to deformations within the gauge equal. In order to accomplish this I may choose different dimensions or materials for the flexure plates, or change their separation or change or redistribute the mass of either member 1 or 2 in order to alter its moment of inertia, or make use of any combination of these expedients. Furthermore this adjustment need not destroy compensation for longitudinal accelerations as previously described.

In Fig. 6 of the drawings there is illustrated an optical lever type of strain gauge which is compensated for vibration effects in accordance with the principles of my invention. This gauge as shown comprises two members 21 and 22 provided with knife edges 23, 24, and 25, 26 respectively. The knife edges 23 and 25 are pivotally mounted with respect to the connecting member 27 while knife edges 24 and 26 are held in engagement with the surface 28 of the body whose strain is to be measured by means of any suitable clamping device 29. The surfaces 30 and 31 of the members 21 and 22 are suitably polished or silvered to reflect an incident light beam as shown, it being clear that the direction of the reflected beam provides a measure of the strain in the body under test since any strain causes rotation of member 21 relative to member 22. This gauge is readily compensated for longitudinal accelerations of the gauge as a whole by making the parts 21 and 22 of equal mass and stiffness and by arranging these parts symmetrically with respect to a vertical axis passing through the point 32.

Thus for an acceleration toward the left, for example, the system of inertia forces acting on the member 27 will consist of external forces applied at the knife edges 23 and 25 and directed toward the right, internal forces acting throughout the member 27 toward the right, and a force applied at the point 32 toward the left to balance the above forces. This system of forces will clearly produce an extension in the member 27 between the knife edge 25 and the point 32 and an equal compression in the said member between the knife edge 23 and the point 32 so that under longitudinal accelerations the length of the member 27 will remain unchanged. Furthermore, any deformation of the knife edges 24 and 26 will be compensated since they have the same stiffness and are subjected in use to the same inertia or reaction forces.

The effect of vertical or transverse accelerations of the gauge in Fig. 6 as a whole upon the reading of the gauge may also be reduced and practically compensated by making the point 32 and the knife edges 23 and 25 lie along the neutral axis 33 of the member 27. Thus when the member 27 bends as a result of vertical accelerations imparted to the gauge as a whole the changes in the length of the neutral axis will be reduced to second order effects with respect to this type of motion. Furthermore, rotational acceleration of the gauge as a whole will have no effect upon the reading of the gauge, since by symmetry rotation of the members 21 and 22 caused by deformation resulting from this type of acceleration will be equal. My gauge is then compensated for effects caused by three different types of inertia forces, namely those caused by longitudinal accelerations of the gauge as a whole, those caused by transverse accelerations of the gauge as a whole, and those caused by rotational accelerations of the gauge as a whole.

Up to this point only inertia forces arising from either translational or rotational accelerations of the strain gauge as a whole have been considered. In general these forces are the most troublesome. First, because they may be many times larger than the inertia forces arising from the relative motion of the parts of the gauge attending the measurement of a vibratory strain and second they are not determined by the character of the strain which is to be measured. In some cases, however, it may be desirable to compensate a gauge for deformations of the component gauge parts occasioned by relative movement of two of its parts attending the measurement of a vibratory strain since these distortions may cause the reading of the gauge to depend upon the frequency as well as the amplitude of the vibratory strain. The gauge of Fig. 6 may be compensated for the distortions occasioned by relative movement of the parts 21 and 22 attending the measurement of a vibratory strain. Since the members 21 and 22 rotate about axes at their knife edges 23 and 25 in response to a strain in the body under test between the knife edge supports 24 and 26, angular accelerations about the axes at the knife edges 23 and 25 give rise to inertia forces at these points and at the knife edges 24 and 26 which must be compensated.

It may easily be proved, for example, that if the member 21 is square in cross-section as shown, and centrifugal forces are neglected, the external inertia forces acting on said member at the knife edge 24 and the pivot point 23, accompanying angular acceleration about the pivot point 23, are in the same direction and in the ratio of 2 to 1. It remains therefore only to adjust the stiffness of the member 27 between the point 32 and the knife edge 23 so that the combined distortion of this portion of the member 27 and the knife edge 23 balances the distortion of the knife edge at 24, thus preventing rotation of 21 as a result of these deformations occasioned by the inertia forces acting. When a similar adjustment is made for the part 22 and the portion of member 27 adjacent thereto, the gauge will be compensated for deformations of the component gauge parts occasioned by relative movement of the parts 21 and 22 attending the measurement of a vibratory strain with the result that any frequency effect wil be eliminated. The adjustment discussed in this paragraph will not necessarily affect the adjustment of the gauge for translational and rotational accelerations of the gauge as a whole as described in detail hereinbefore. From the foregoing, it is clear that the gauge of Fig. 6 may, if desired, be simultaneously compensated for four distinct types of motion.

Figure 7:
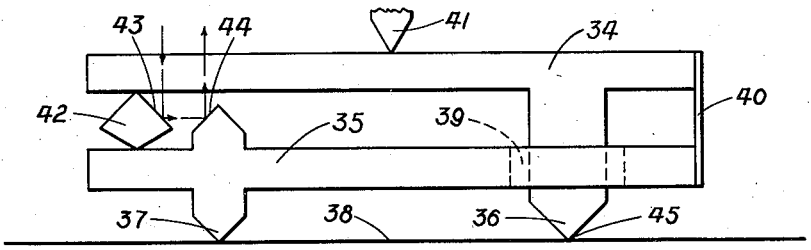
Fig. 7 is a diagrammatic representation of another and still further type of strain gauge compensated in accordance with my invention.

In Fig. 7 of the drawings is shown a still further type of strain gauge which includes two relatively movable parts 34 and 35 provided with knife edges 36 and 37 respectively for engaging the surface 38 of a body whose strain is to be determined. Relative movement between the parts 34 and 35 is made possible by the somewhat extended slot 39 in the member 35 and the flexure plate 40 which is designed to carry compressive loads in order to stabilize the system for a constant clamping force applied to the gauge by any suitable clamping device 41. The relative longitudinal motion of the parts 34 and 35 may be measured by any suitable indicating device which for simplicity is shown as an optical system comprising a rocker 42 provided with a suitably polished or reflecting surface 43 for cooperation with a complementary reflecting surface 44 forming part of the member 35. Compensation for longitudinal accelerations of the gauge as a whole may be readily accomplished in the manner described hereinbefore which includes proportioning the stiffness of the members 34 and 35 to their respective masses such that the inertia forces acting due to this type of acceleration will produce substantially no effect upon the indicating device. Vertical or transverse accelerations, however, will in general produce bending in the horizontal parts of the members 34 and 35 which in turn will result in a tilting of the vertical portions of these members about their knife edges 36 and 37. This may result in a spurious indication of the gauge. It is clear, however, that by shifting the position of the rocker 42 the relative bending moments acting on parts 34 and 35 may be so adjusted that the individual effects will compensate each other. In practice the member 35, for example, may be so rigid compared to the member 34 that shifting the position of the rocker will have little or no effect in attempting to compensate the gauge for the bending moments. The gauge may then be compensated for vertical accelerations of the same as a whole by choosing the proper distance between the point 45 of the knife edge 36 and the plane of the flexure plate 40.

Figure 8:
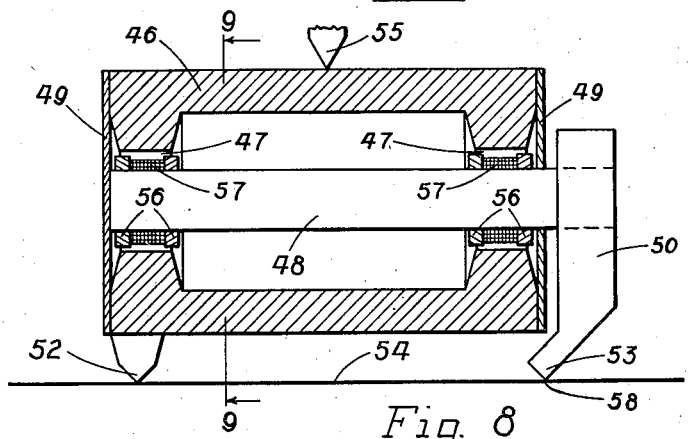
Fig. 8 shows a partial cross-sectional view in elevation of an electromagnetic type of strain gauge taken on the longitudinal axis thereof and embodying the principles of my invention.
Figure 9:
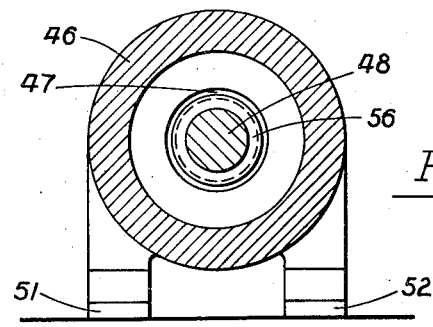
Fig. 9 is a sectional view of this gauge taken on the line 9—9 of Fig. 8.

Turning now to Figs. 8 and 9 of the drawings, there is shown depicted therein an electromagnetic type of strain gauge embodying the principles of my invention. This gauge as shown includes a substantially cylindrical shell or member 46 of soft iron or equivalent magnetic material apertured at 47 to receive a substantially permanently magnetized core 48 of high permeability and retentivity. The shell is secured at both ends to the core 48 by means of non-magnetic flexure plates 49 and one end of the said core as shown is firmly attached to a vertical member 50 of relatively non-magnetic material. The cylindrical member 46 is provided with a plurality of knife edges 51 and 52 and the member 50 with a knife edge 53, all of which are held in secure engagement with the surface 54 of the body whose strain is to be measured by means of any suitable clamping device 55. Thus, the knife edges provide a three point support for the strain gauge. As shown in the drawings, the core 48 is provided adjacent each end with a pair of rings 56 of soft iron or other suitable magnetic material secured thereto in any suitable manner. Interposed between each pair of rings and insulatingly wound thereon is a plurality of turns of wire 57 which are adapted for connection to any suitable indicating device known to the prior art. The non-magnetic flexure plates 49 serve to hold the core 48 properly centered with respect to the shell 46 but yet permit relative longitudinal motion between the parts 46 and 48 in response to a strain in the body under test. When the gauge is not measuring a strain there is a predetermined flux distribution through the core 48, rings 56 and cylindrical member 46. If now any relative movement between the parts 46 and 48 is caused by a vibratory strain in the body under test the reluctance of the air gaps between the parts 48 and 46 will be altered with the result that there will be a redistribution of the flux lines thereacross with attendant induction of a voltage in the coils 57. A suitable indicating device may be caused to be actuated by the voltages so induced and thereby measure the magnitude of the strain.

This gauge can be made self-compensating with respect to strains introduced into the component parts thereof by transverse accelerations of the gauge as a whole. If the point 58 of the knife edge 53 is placed in the same vertical plane as that of the flexure plate 49 the effect of vertical accelerations will be nearly eliminated. If, however, any distortion in the cylindrical member 46 and core 48 due to vertical accelerations is still sufficient to cause appreciable error, this can be compensated by shifting the knife edge 53 slightly with respect to the flexure plate 49. The optimum position for this knife edge 53 may be determined empirically and permanently incorporated in the gauge.

More serious errors may arise from internal deformations of the gauge parts due to longitudinal accelerations of the gauge as a whole. These deformations, however, may be compensated by choosing the mass and stiffness of the various gauge parts such that the inertia forces acting will not substantially affect the readings of the indicating device under these operating conditions as described hereinbefore in connection with the other types of gauges. In connection herewith, however, it may be stated that the gauge can be compensated for longitudinal accelerations by removing material from the gauge at suitable points until strain readings are shown by test to be independent of these accelerations. This compensation may be simplified by making the knife edges similar in shape but with a length in proportion to the horizontal load they must carry. In making this balance the effects of inertia reactions of the clamping device on the unit should be compensated. The gauge may be so rigid that the small differences in acceleration of the two members arising from the strain which is to measured will not cause appreciable error. For this reason blunt knife edges are suggested.

While all devices in the drawings in the interest of clarity and with a view to making my invention easily comprehendible have been described as devices for measuring one type of relative displacement, namely a strain, it is to be emphasized that all devices may be used for measuring any other type of relative displacement. Thus as illustrative but not restrictive of a relative displacement which is not a strain and is capable of being measured by my devices, it may be necessary to measure the relative displacement occurring between two members of a body which is subjected to vibratory motion. More specifically it may be necessary to measure any variation in the width of a gap in a body incidental to vibratory motion thereof. This may be easily accomplished by clamping a gauge compensated in accordance with my invention to the body in a position to bridge the gap.

Furthermore, any device compensated in accordance with my invention may be used for detecting any relative displacement in a body subjected to vibratory motion without being concerned with the measurement or the determination of the magnitude of the displacement. It goes without saying that measurement of a displacement necessarily includes detection of the displacement. Hence in order to cover all aspects of the many uses of my devices, the devices will be referred to in the claims as devices for detecting any relative displacement in a body subjected to vibratory motion or equivalent language.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. A device for detecting relative displacements in a body under acceleration, comprising in combination at least two elastically deformable members which are adapted to engage the body in which the relative displacement is to be detected and which are operable to move relatively to each other upon the occurrence of any relative displacement in the said body, means for indicating any relative displacement between certain parts of said two members, the masses of said members being related to their stiffness such that the movements of said parts due to inertial deformations of the members will be substantially equal, whereby said inertial deformations will produce substantially no effect upon the indicating means.

2. A device for detecting relative displacements in a body under acceleration, comprising in combination at least two elastically deformable members which are adapted to engage the body in which the relative displacement is to be detected and which are operable to move relatively to each other upon the occurrence of any relative displacement in the said body, means for indicating any relative displacement between certain parts of said two members, the masses of said two members being equal and their stiffness being related to their masses such that the movements of said parts due to inertial deformations of the members will be substantially equal, whereby said inertial deformations will produce substantially no effect upon the indicating means.

3. A device for detecting relative displacements in a body under acceleration, comprising in combination a longitudinal member and two members which are arranged for pivotal movement with respect thereto, the two members being adapted to engage the body in which the relative displacement is to be detected and being operable to move relatively to each other upon the occurrence of any relative displacement in the said body, means for indicating any relative displacement between said two members, the said device being substantially compensated for transverse accelerations of the device as a whole by positioning the pivotal points of the two members along the neutral axis of the longitudinal member.

4. A device for detecting relative displacements in a body under acceleration, comprising in combination a longitudinal member and two members which are arranged for pivotal movement with respect thereto, the two members being adapted to engage the body in which the relative displacement is to be detected and being operable to move relatively to each other upon the occurrence of any relative displacement in the said body, means for indicating any relative displacement between said two members, the said device being substantially compensated for longitudinal and transverse accelerations of the device as a whole by arranging the members of said device symmetrically with respect to an axis perpendicular to the longitudinal axis of said longitudinal member and by positioning the pivotal points of the two members along the neutral axis of the longitudinal member.

5. A device for detecting relative displacements in a body under acceleration, comprising in combination at least two elastically deformable members which are adapted to engage the body in which the relative displacement is to be detected and which are operable to move relatively to each other upon the occurrence of any relative displacement in the said body, means for indicating any relative displacement between certain parts of said two members, the masses of said two members being unequal and their stiffness being related to their masses such that the movements of said parts due to inertial deformations of the members will be substantially equal, whereby said inertial deformations will produce substantially no effect upon the indicating means.

6. A device for detecting relative displacements in a body under acceleration, comprising in combination two members which are adapted to engage the body in which the relative displacement is to be detected and which are operable to move relatively to each other upon the occurrence of any relative displacement in said body, one of said members being apertured to receive the other of said members, means operable to indicate any relative displacement between parts of said members, the mass and stiffness of each member being chosen such that the inertia forces acting will produce substantially no effect upon the indicating means although the said members are elastically deformed when the device is used for its intended purpose.

7. A device for detecting relative displacements in a body, comprising in combination an apertured magnetic member, a substantially, permanently magnetized member movably secured to said first mentioned member and disposed at least in part within the same, a substantially non-magnetic support engaging said magnetized member, the said first mentioned member and non-magnetic support being adapted to engage the body in which the relative displacement is to be detected and the said members being operable to move relatively to each other upon the occurrence of any relative displacement in the said body, a plurality of projections of magnetic material extending from said magnetized member and having interposed therebetween a plurality of turns of insulated wire for connection to a suitable indicating device, the mass and stiffness of the parts of the detecting device being such that the inertia forces acting will produce substantially no effect upon the indicating device although the parts are elastically deformed when the detecting device is used for its intended purpose.

8. A device for detecting relative displacements in a body, comprising in combination an apertured magnetic member, a substantially, permanently magnetized member movably secured to said first mentioned member and disposed at least in part within the same, a substantially non-magnetic support engaging said magnetized member, the said first mentioned member and non-magnetic support being adapted to engage the body in which the relative displacement is to be detected and the said members being operable to move relatively to each other upon the occurrence of any relative displacement in the said body, a plurality of projections of magnetic material extending from said magnetized member adjacent one end thereof and having interposed therebetween a plurality of turns of insulated wire for connection to a suitable indicating device, the mass, stiffness and arrangement of the parts of the detecting device being such that the inertia forces acting will produce substantially no effect upon the indicating device although the parts are elastically deformed when the detecting device is used for its intended purpose.

9. A device for detecting relative displacements in a body, comprising in combination an apertured magnetic member, a substantially, permanently magnetized member movably secured to said first mentioned member at each end thereof and disposed at least in part within the same, a substantially non-magnetic support engaging said magnetized member, the said first mentioned member and non-magnetic support being adapted to engage the body in which the relative displacement is to be detected and the said members being operable to move relatively to each other upon the occurrence of any relative displacement in the said body, a plurality of projections of magnetic material extending from said magnetized member adjacent each end thereof and having interposed therebetween a plurality of turns of insulated wire for connection to a suitable indicating device, the mass and stiffness of the parts of the detecting device being such that the inertia forces acting will produce substantially no effect upon the indicating device although the parts are elastically deformed when the detecting device is used for its intended purpose.

WILLIAM M. BLEAKNEY.